(No Model.)
T. F. STEVENSON.
METHOD OF MAKING SHOVELS, SCOOPS, &c.
No. 408,817. Patented Aug. 13, 1889.
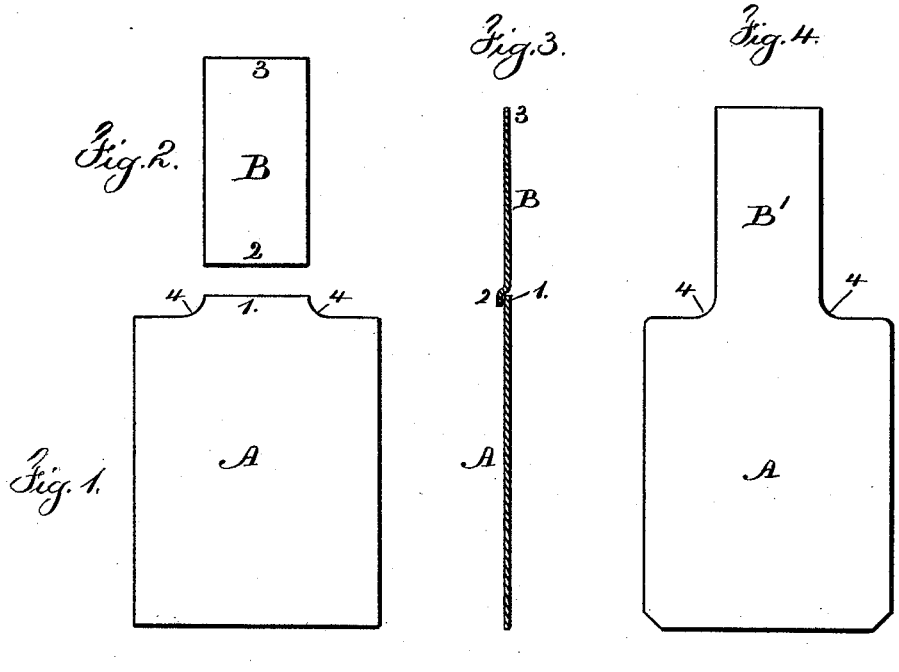
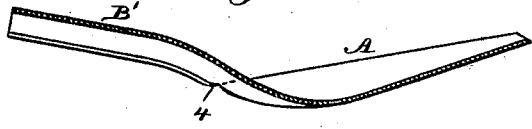
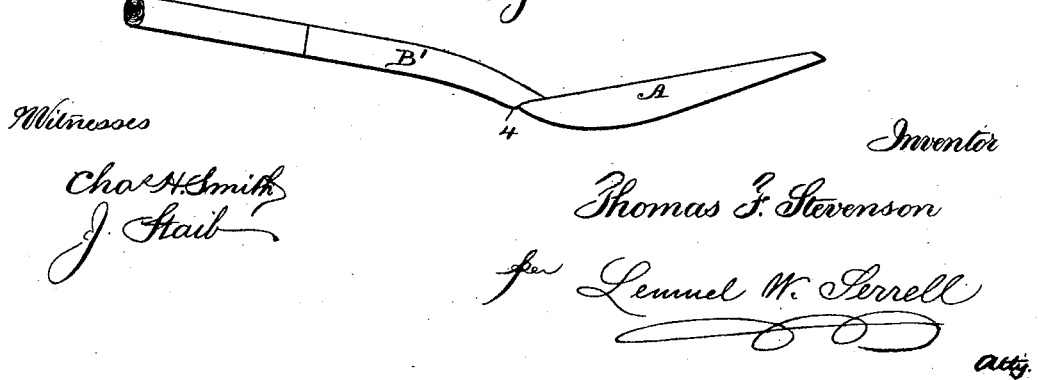

UNITED STATES PATENT OFFICE.

THOMAS F. STEVENSON, OF BROOKLYN, NEW YORK.

METHOD OF MAKING SHOVELS, SCOOPS, &c.

SPECIFICATION forming part of Letters Patent No. 408,817, dated August 13, 1889.

Application filed December 10, 1888. Serial No. 293,115. (No model.)

*To all whom it may concern:*

Be it known that I, THOMAS F. STEVENSON, of Brooklyn, in the county of Kings and State of New York, have invented an Improved Method of Making Shovels, Scoops, &c., of which the following is a specification.

Shovels and scoops have heretofore been made of sheet-steel cut out to shape by dies and having a tang or shank integral with the sheet metal of the blade, so that the shovel can be completed by pressure between dies that give to the sheet metal a proper shape and bend up the shank into the tubular socket for the reception of the wooden handle. A reference is hereby made to Letters Patent No. 142,859, September 16, 1873, and No, 155,532, September 29, 1874, to H. L. Lowman, for dies and a method of manufacturing shovels. In shovels of this character there is considerable loss of material in cutting out the sheet-steel, and in addition to this the steel is liable to crack and become injured in bending the same up into the tubular form for the wooden handle, and in uniting up the rivets that pass through the tubular socket and wooden handle the steel is liable to crack and break.

My present improvement is for lessening the expense involved in the manufacture of shovels by saving in the sheet metal made use of and for rendering the tubular socket or handle lighter and better adapted to ordinary use than the sockets or handles of shovels heretofore constructed.

In the drawings, Figure 1 represents the shovel-blank as cut from sheet-steel. Fig. 2 shows the blank of sheet metal cut out to form the handle. Fig. 3 is a side view of the parts as in position for welding. Fig. 4 shows the shovel-blank as trimmed and ready to be stamped into the form of a finished shovel, and Fig. 5 is a side view, and Fig. 6 a section, of the finished shovel.

The blade A is to be made of sheet-steel cut out roughly to the form of the shovel, but having a lip 1 at the side thereof that is to form the top of the blade. The blank B, Fig. 2, is of sheet metal corresponding in width to the length of the lip 1, and the length of this blank B corresponds to the length of the tubular socket or of the complete shovel-handle, as desired, and this blank B may be of uniform thickness throughout; but it is preferable to roll the same so that the end 3 is thinner than the end 2, in order that the strength of the socket or handle may be proportioned throughout.

In the manufacture of the shovel the end 2 of the blank B is welded to the lip 1 upon the blade A, and this welding operation may be performed by electricity in the manner well known as electrical welding; but when the welding is performed in the ordinary manner the end 2 of the blank B is preferably bent in a die or swage to form a shoulder or offset, as shown in Fig. 3, so that after the blade A and the end of the blank B are brought to a welding heat the shoulder at the end 2 becomes a gage in lapping the blank B upon the blade A as the parts are placed beneath the swage or hammer that welds the two parts together and reduces the metal to a uniform thickness. After this welding operation has been performed the edges of the sheet metal are trimmed off true by dies or shears, so that the flat blank can be struck up between dies similar to those represented in Letters Patent No. 155,532, for producing the desired shape of shovel or scoop, and in this operation the socket or handle portion B' is bent up into a U shape and then the edges of the metal are brought together in a suitable die, so as to render the handle or socket for receiving the wooden handle tubular.

I find in practice that it is important to avoid sharp angles or corners upon the sheet-metal blank because where such sharp angles or corners exist the metal is liable to be torn or cracked in the subsequent operations of striking the shovel up to shape in the dies. I therefore round the metal with care, especially at the portion 4, between the blade A and the blank B, so that when the handle and blade are struck up in the dies to form the shovel, spade, or scoop illustrated in Figs. 5 and 6 the metal will be stretched and properly bent along the curved portions 4, and not only will the strength of the shovel at this point be maintained, but in striking up the parts the metal will be folded over and the junction of the shovel blade or socket rendered very stiff at the point where the greatest strain comes upon the same.

If the blank B is of the strength adapted to form the entire handle, there may be any desired knob, grip, or handle-piece at the upper end of the tube, as this forms no part of my invention, and if the blank B is shorter, so as to form a tubular socket for the wooden handle, such wooden handle is preferably driven into the socket after the wood has been thoroughly steamed, so that it bends easily and assumes the contour of the tubular socket. I do not limit myself to any particular shape of the blade for a shovel, spade, or scoop, nor to the length of the handle or tubular socket.

I claim as my invention—

1. The method herein specified of manufacturing shovels, spades, or scoops, consisting in cutting out a blank for the blade and another blank for the tubular socket or handle and welding the two parts together while in a flat condition, and then bending up the blade and the tubular socket or handle to shape between dies, substantially as set forth.

2. The method herein specified of manufacturing shovels, spades, or scoops, consisting in cutting out the sheet-metal blank for the blade with the lips 1 at one end of such blank, welding the end of the blank B upon the lip 1, and striking up the sheet-metal blanks to the form of the complete shovel, spade, or scoop within dies and bending the handle or socket portion into the form of a tube, substantially as set forth.

3. The method herein specified of manufacturing shovels and similar articles, consisting in cutting out a rough blank to form the blade and a second blank to form the socket or handle, welding the two parts together while in a flat condition, trimming off the edges of the blank to the proper shape with the rounded portions 4 at the junction of the blanks A and B, and striking up the blank to the shape of the shovel or similar article and bending the socket or handle to a tubular form, substantially as set forth.

Signed by me this 3d day of December, 1888.

THOMAS F. STEVENSON.

Witnesses:
GEO. T. PINCKNEY,
WILLIAM G. MOTT.